United States Patent
Lin

(10) Patent No.: US 6,504,477 B1
(45) Date of Patent: Jan. 7, 2003

(54) SECONDARY ALERT LIGHT FOR MOTOR VEHICLES

(76) Inventor: Yu-Chu Lin, No. 477, Chung Shan N. Rd., Yung Kang City, Tainan Hsien (TW)

( * ) Notice: Subject to any disclaimer, the term of this patent is extended or adjusted under 35 U.S.C. 154(b) by 0 days.

(21) Appl. No.: 09/963,032

(22) Filed: Sep. 26, 2001

(51) Int. Cl.[7] .................................................. B60Q 1/52
(52) U.S. Cl. ...................... 340/472; 340/478; 340/483; 362/540; 362/541; 362/545
(58) Field of Search ................... 340/472, 463, 340/464, 468, 469, 471–473, 478, 479, 483; 362/540, 541, 542, 543, 544, 545

(56) References Cited

U.S. PATENT DOCUMENTS

| 2,190,035 A | * | 2/1940 | Loungway ................... 177/327 |
| 3,382,354 A | * | 5/1968 | Hedgewitch et al. ..... 240/41.38 |
| 3,759,084 A | * | 9/1973 | Plewka ........................ 240/7.1 |
| 4,963,798 A | * | 10/1990 | McDermott .................. 315/312 |
| 5,984,494 A | * | 11/1999 | Chapman et al. ............ 362/240 |
| 6,220,736 B1 | * | 4/2001 | Dobler et al. ................ 362/539 |

* cited by examiner

Primary Examiner—Daniel J. Wu
Assistant Examiner—Son Tang
(74) Attorney, Agent, or Firm—Rosenberg, Klein & Lee

(57) ABSTRACT

A secondary alert light for a motor vehicle comprises a light holder, a light convergence ring and light emission devices; positioning posts on the light holder locking up the light convergence ring; the ring being light permeable having reflection units with each composed of angular crystals each having a cut at an inclination arranged at equal spacing and mating posts corresponding to the positioning posts on the light holder; at least two recesses being provided on the circumference of the light convergence ring each to house a pair of light emission devices; and the light convergence ring being locked to the light holder with the circumferences of the reflection unit to converge light emitted from the light emission devices to achieve alert effect.

2 Claims, 3 Drawing Sheets

SECONDARY ALERT LIGHT FOR MOTOR VEHICLES

BACKGROUND OF THE INVENTION (a) Field of the Invention

The present invention relates to a secondary alert light for motor vehicles, and more particularly to one that improves alert effects for the motor vehicle lights by means of a circumference light convergence ring to warn approaching or following vehicles.

(b) Description of the Prior Art

While riding or driving a motor vehicle at night, headlights are required to see clear the road ahead and alert approaching vehicles. A light holder to improve reflection from the headlight is only used for the prior art, the light intensity appears to be insufficient in case of riding or driving in fog or dim area.

Furthermore, when braking is applied, the brake light to the taillight is on to alert the following vehicles. However, it is difficult to tell whether the braking light is on or not, thus preventing an immediate alert to the drivers and that presents a potential hazard.

SUMMARY OF THE INVENTION

The primary purpose is to provide a secondary alert light essentially composed of a light holder, a light convergence ring and multiple light emission devices to exaggerate alert effects. A light and a reflection shade are provided on the light holder and the light may be a braking light, a fog light or a headlight. To achieve the purpose, said light convergence ring related to a light permeable ring has its circumference on one side disposed with multiples of light reflection units arranged at equal spacing. Each unit relates to a crystal with a cut at a certain inclination. Locking posts are provided on the same side of the circumference in relation to those on the light shade. Two or more than two positioning recesses are provided in the ring at a equal spacing and said light emission devices are provided inside the recess to reflect the light collected by the ring to achieve significant alert effect once the light is on.

DETAILED DESCRIPTION OF THE PREFERRED EMBODIMENTS

Figure 1:
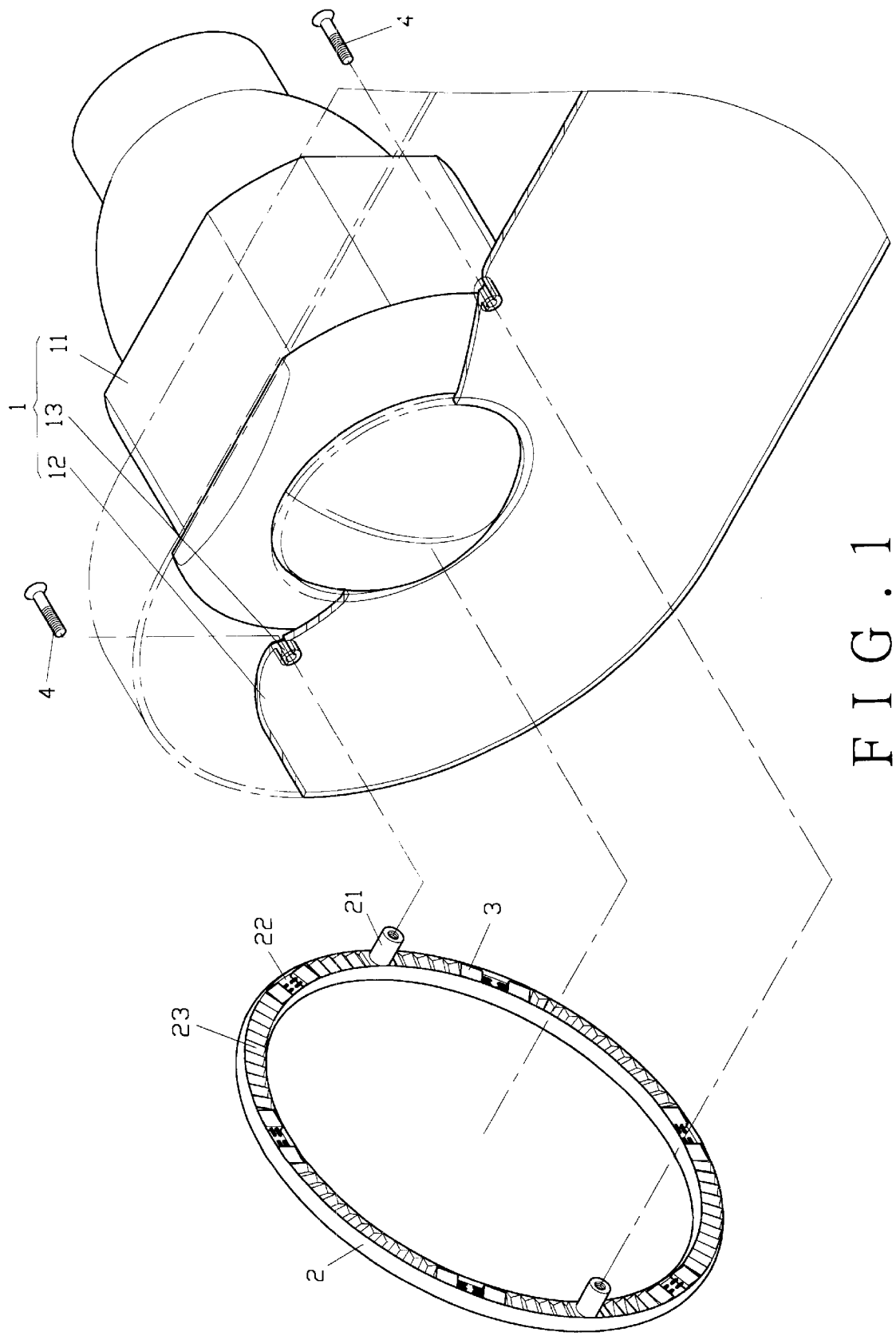
FIG. 1 is an exploded view of a preferred embodiment of the present invention.

Referring to FIG. 1, a preferred embodiment of the present invention comprises a light holder (1), a light convergence ring (2) and multiples of light emission device.

The light holder (1) comprises a light (11) and a reflection shade (12). The light (11) may be a braking light, a fog light or a head light. Two locking posts (13) protrude from the reflection shade (12) respectively to lock up the light convergence ring (2).

The light convergence ring (2) relates to a light permeable ring and has on its circumference protruding two mating posts (21) to receive the locking post (13) on the light holder (1). Two or more than two recesses (22) for positioning purpose are provided at equal spacing on the circumference of the light convergence ring (2). Each of the recesses (22) houses a pair of light emission devices (3) disposed facing each other. The light emission device may be a light emission diode (LED) controlled by a drive circuit (detailed not provided herein since the circuit does not fall within the scope of claims to be filed in this application). A reflection unit (23) is provided between any two abutted reuses (22) on the same side of the circumference of the light convergence ring (2). The reflection unit (23) is composed of multiples of angular crystal arranged at equal spacing with each has a cut at a certain inclination for magnifying light convergence effect.

Figure 2:
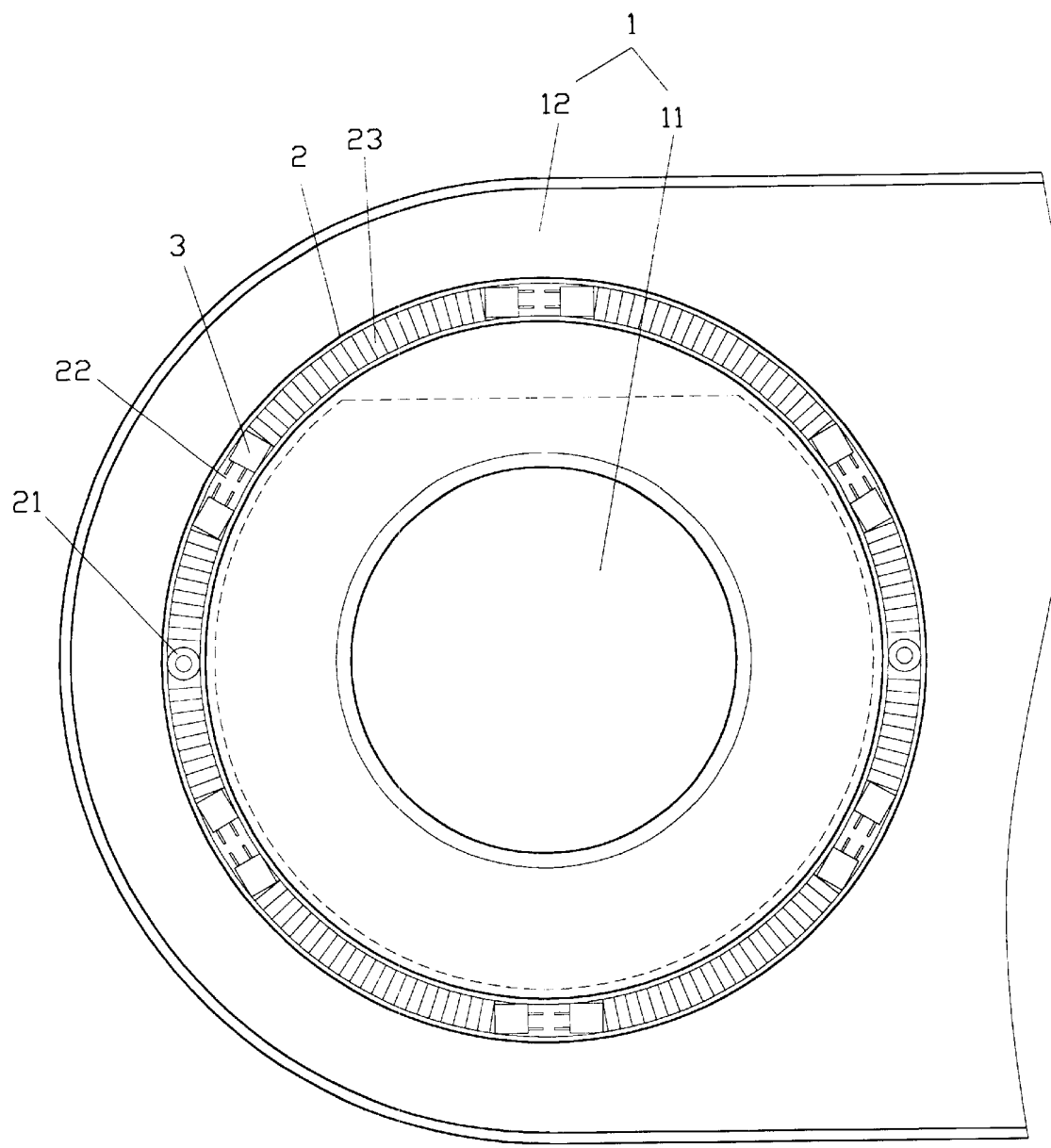
FIG. 2 is a front view of an assembly of the preferred embodiment of the present invention.
Figure 3:
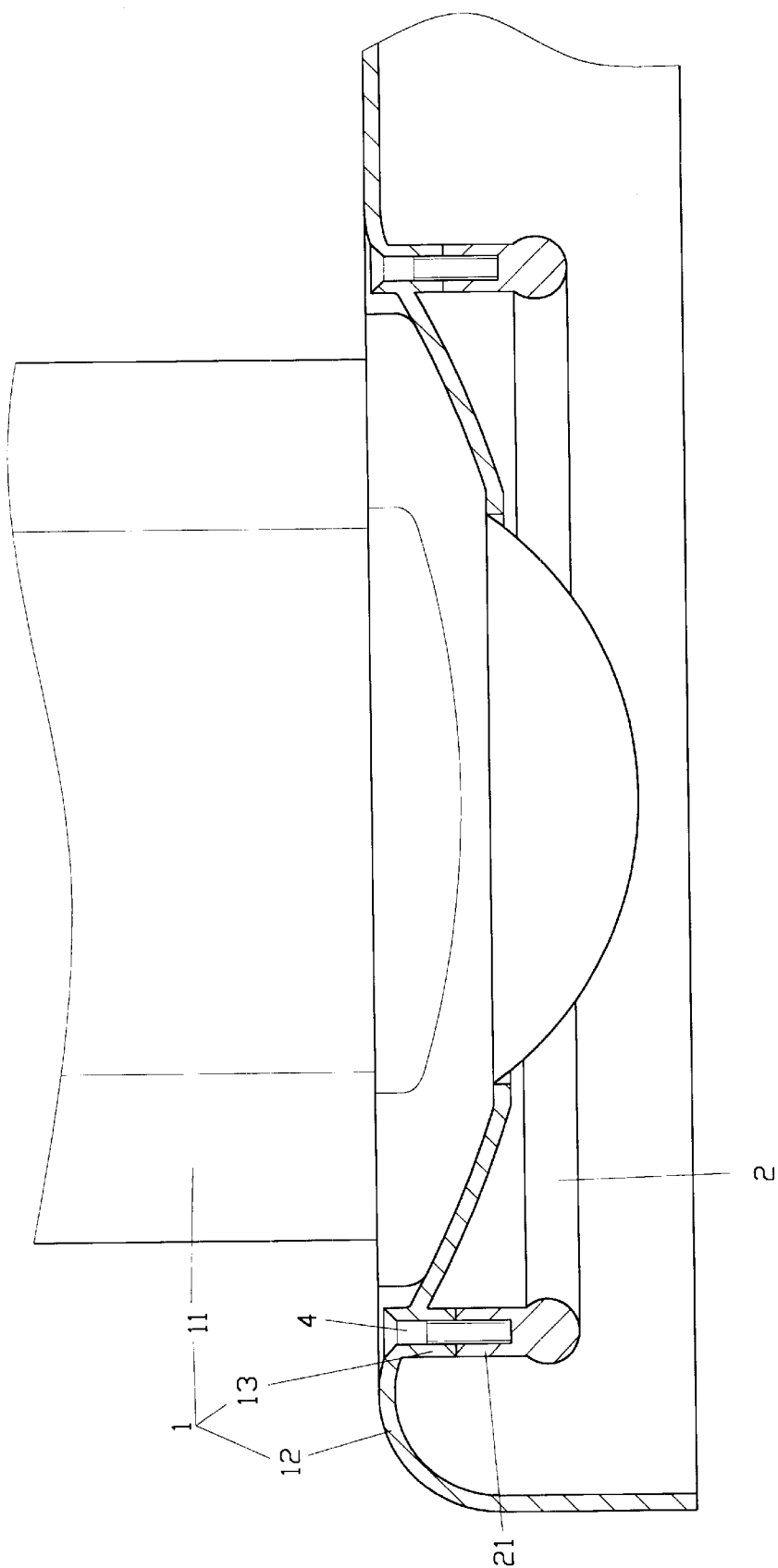
FIG. 3 is a top sectional view of the assembly of the preferred embodiment of the present invention.

Upon assembling as illustrated in FIGS. 2 and 3, the light emission devices are inserted in each positioning recess (22) in the light convergence ring (2) with their light emission end respectively facing the inner end of the recess (22). The recess (22) is filled up with transparent insulation glue to hold the light emission devices (3) in position. The mating posts (21) protruding from the light convergence ring (2) are aligned to the positioning posts (13) on the light holder (1) and locked to each other with a fastening device (4). In practice, light of the light (11) is projected by the reflection shade (12) and the light emission devices (3) emit the light one by one with the positioning recess (22) as a unit. The reflection units (23) of the light convergence ring (2) converge the light emitted from the light emission devices (3) and emit the light one by one. Alternatively, the light emission devices (3) inside the (22) may be made to emit the light simultaneously. Then the light is converged by the multiples of reflection units (23) of the light convergence ring (2) to form a circle of light on the circumference of the light (11). Light emission mode varies depending on the design of the drive circuit to intensify the alert effect for the light (11) on the light holder (1).

The present invention as disclosed effectively provides a secondary lighting structure for the existing light in a motor vehicle. The light emitted from the light convergence ring and dynamic movement of the light for both approaching vehicles in the opposite direction and following vehicles behind to immediately identify the location of the vehicle in between.

I claim:

1. A secondary alert light for a motor vehicle comprising:
    a light holder including:
        a light;
        a reflection shade having a pair of positioning posts protruding therefrom;
    a light convergence ring constructed from a light permeable material and being provided with a plurality of reflection units on a circumference thereof, each reflection unit including a plurality of angular refractors, each of the angular refractors being formed at a predetermined angle and arranged on the circumference with equal spacing;
    mating posts formed on the light convergence ring corresponding in position to the positioning posts on the light holder; and
    a plurality of recesses formed on the circumference of the light convergence ring, each of the recesses housing a pair of light emission devices affixed therein, wherein each of the light emission devices is oriented so that light emitted from a light emitting surface thereof impinges on the plurality of refractors and wherein the light convergence ring is locked in position with the light holder so that the reflection units refract and reflect light emitted from the light emission devices to achieve a predetermined illumination effect around the light.

2. A secondary alert light for a motor vehicle as claimed in claim 1, wherein, said light emission device relates to a light emission diode (LED).

* * * * *